UNITED STATES PATENT OFFICE.

WILHELM HAMPE AND CARL SCHNABEL, OF HANOVER, GERMANY.

MANUFACTURE OF ZINC OXID.

SPECIFICATION forming part of Letters Patent No. 579,750, dated March 30, 1897.

Application filed August 1, 1896. Serial No. 601,378. (No specimens.)

*To all whom it may concern:*

Be it known that we, WILHELM HAMPE and CARL SCHNABEL, of the University of Clausthal, Hanover, in the Empire of Germany, have invented new and useful Improvements in the Manufacture of Zinc Oxid, of which the following is a full, clear, and exact description.

Our invention relates to a discovery which we have made that if finely-divided and dried zinc sulfate be intimately mixed with finely-divided carbon (preferably in the form of wood-charcoal) and the mixture be subjected to an even and correctly-gaged temperature of 650° centigrade (as nearly as practicable) for a time, which may be roughly stated at two hours, more or less, the following reaction takes place, viz:

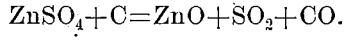
$$ZnSO_4 + C = ZnO + SO_2 + CO.$$

This reaction is complete within a very small limit if the above conditions are correctly observed, so much so that if the correct quantity of carbon to satisfy the above reaction be employed—viz., about 7.5 per cent. of the weight of the dried sulfate—and if the temperature be properly gaged the finished product is found to contain seventy-eight per cent. to eighty per cent. of zinc and only one-half per cent. to one per cent. of sulfur as basic sulfate and sulfid of zinc.

For the successful working of the process it is essential that the following precautions be taken, viz: First, the zinc sulfate must be dried, by which is meant freed from water of crystallization; second, the mixture of the finely-divided and dried zinc sulfate with the finely-divided carbon must be intimate, and, third, the temperature must be carefully regulated, so as to be as nearly as practicable 650° centigrade.

The substantial advantages of this method lie in the fact that, first, a much lower temperature is required to obtain zinc oxid from zinc sulfate than by any other means hitherto known, and therefore the operation is practical and cheap, being hitherto expensive and practically impossible commercially; second, gases rich in $SO_2$ are produced which can be made directly into sulfuric acid in lead chambers of comparatively small size; third, the zinc oxid produced is very pure and practically free from all other substances except a very small amount of sulfur and a minute quantity of ash from the charcoal.

The zinc sulfate may be obtained from zinc ores, such as blende or mixed blende and galena, by the use of sulfuric acid, and the sulfuric acid can then be reproduced from the $SO_2$ obtained by the process.

Having now particularly described and ascertained the nature of our said invention and in what manner the same is to be performed, we declare that what we claim is—

The process for preparing zinc oxid consisting in subjecting an intimate mixture of finely-divided and dried zinc sulfate and finely-divided carbon to an even and correctly-gaged temperature, substantially as described.

July 15, 1896.

WILHELM HAMPE.
CARL SCHNABEL.

In presence of—
L. B. TINGLE,
A. K. TINGLE.